(12) United States Patent
Schwarz (10) Patent No.: US 11,565,512 B2
(45) Date of Patent: Jan. 31, 2023

(54) RECYCLABLE, HIGH BARRIER SHEET AND TRAY

(71) Applicant: Sonoco Development, Inc., Hartsville, SC (US)

(72) Inventor: Richard A. Schwarz, Kyle, TX (US)

(73) Assignee: Sonoco Development, Inc., Hartsville, SC (US)

( * ) Notice: Subject to any disclaimer, the term of this patent is extended or adjusted under 35 U.S.C. 154(b) by 139 days.

(21) Appl. No.: 17/126,352

(22) Filed: Dec. 18, 2020

(65) Prior Publication Data

US 2021/0206151 A1 Jul. 8, 2021

Related U.S. Application Data

(60) Provisional application No. 62/952,602, filed on Dec. 23, 2019.

(51) Int. Cl.
| | |
|---|---|
| B32B 27/30 | (2006.01) |
| B32B 27/32 | (2006.01) |
| B32B 7/12 | (2006.01) |
| B32B 18/00 | (2006.01) |
| B32B 27/26 | (2006.01) |
| B29C 51/14 | (2006.01) |
| B29C 48/18 | (2019.01) |
| B32B 37/12 | (2006.01) |

(52) U.S. Cl.
CPC ............ *B32B 27/306* (2013.01); *B29C 48/18* (2019.02); *B29C 51/14* (2013.01); *B32B 7/12* (2013.01); *B32B 18/00* (2013.01); *B32B 27/26* (2013.01); *B32B 27/32* (2013.01); *B32B 37/12* (2013.01); *B32B 2255/26* (2013.01); *B32B 2307/7244* (2013.01); *B32B 2307/7265* (2013.01); *B32B 2439/70* (2013.01)

(58) Field of Classification Search
CPC ......... B32B 27/306; B32B 7/12; B32B 18/00; B32B 27/26; B32B 27/32; B32B 37/12; B32B 2255/26; B32B 2307/7244; B32B 2307/7265; B32B 2439/70; B29C 48/18; B29C 51/14
See application file for complete search history.

(56) References Cited

U.S. PATENT DOCUMENTS

| | | |
|---|---|---|
| 5,246,753 A | 9/1993 | Koyama et al. |
| 6,010,757 A | 1/2000 | Yamamoto et al. |
| 8,932,726 B2 | 1/2015 | Paolilli et al. |
| 10,295,261 B2 | 5/2019 | Hershey |

(Continued)

FOREIGN PATENT DOCUMENTS

| | | | | |
|---|---|---|---|---|
| EP | 1541334 A1 | * | 6/2005 | ............ B32B 27/32 |
| JP | 2001-121658 | * | 8/2001 | ............ B32B 27/30 |

(Continued)

*Primary Examiner* — Michael C Miggins
(74) *Attorney, Agent, or Firm* — von Briesen & Roper, s.c.

(57) ABSTRACT

An improved sheet for making a three-dimensional article for holding food, such as a food tray, and a method of making a three-dimensional article. The sheet comprises a substrate and a laminate film. The laminate film may comprise a ceramic film and a copolymer layer. The copolymer layer can repair any cracks that occur in the ceramic film when the sheet is thermoformed. The food tray is considered a single material that is recyclable.

2 Claims, 11 Drawing Sheets

(56) References Cited

U.S. PATENT DOCUMENTS

| | | |
|---|---|---|
| 2011/0311701 A1 | 12/2011 | Lewis et al. |
| 2019/0275560 A1 | 9/2019 | Pietsch et al. |
| 2020/0023622 A1 | 1/2020 | Schwartz |

FOREIGN PATENT DOCUMENTS

| | | |
|---|---|---|
| JP | 2008143103 A | 6/2008 |
| JP | 2019177518 A | 10/2019 |
| WO | 9832603 A1 | 7/1998 |

* cited by examiner

RECYCLABLE, HIGH BARRIER SHEET AND TRAY

BACKGROUND OF THE INVENTION

Field of the Invention

This disclosure relates to a recyclable barrier container. More particularly, this disclosure relates to a container comprising ultra-thin barrier and adhesion materials as an internal part of the container sidewall. In addition, a method is disclosed that combines film coating technology and rigid plastics extrusion and thermoforming technology to make a wide array of barrier containers with very high barrier to moisture and oxygen that are recyclable.

Description of the Related Art

Thermoformed, barrier, rigid food packages typically comprise a thermoformed tray covered with a flexible lidding film. The tray typically is made from sheet comprising polypropylene (PP), polyethylene terephthalate (PET) or polystyrene with a substantial oxygen barrier, typically coextruded or thermally laminated with a high barrier film. These conventional trays are typically not considered recyclable per current definitions. The current recycling requirement is that the main substrate has to be at least 95% of the container. These barrier components comprise well over 5% of the container due to presence of adhesives, barrier resin and regrind containing both in the structure so the substrate is diluted to well under 95%. These other components render the container non-recyclable. Even if these containers made it to a recycling facility they would be rejected and sent to landfill. In some cases, sheet can be coated with a barrier coating and then thermoformed but this has typically been limited to portion control applications where the container is too small to be recovered by the municipal recovery facility (MRF). They end up in the landfill and have no recycle value. The coatings contain chlorine typically that can render any recycle unfit for use even if only small amounts of these chlorine containing containers contaminate the recycle stream. The external coating tends to abrade and scratch during distribution and handling. Internally coated (against food) containers can fail due to attack by aggressive oils and humidity of the food, dramatically reducing the barrier benefit. This can cause food waste because it spoils before it can be consumed.

Today's coextruded barrier layers are typically comprised of ethylene vinyl alcohol (EVOH) or polyamides and associated adhesives referred to as tie layers. These barrier layers tend to be incompatible with the main substrate to the extent that the process regrind cannot be fully reused in the manufacturing of other containers and the tray does not have enough value after it is used to justify collection, cleaning and selling to manufacturers who will place it in higher end applications like food trays or the like. Many times, these trays are simply directed to landfill or downgraded for use into plastic planting pots or the like at a fraction of the value they would have compared to trays made per this disclosure. A truly recyclable material will maintain its value such that it can be used back into high end markets and thus be collected, cleaned and sold into the food or other high end markets. The trays described in this disclosure provide for the highest recycling value because the tray is considered a single material that is recyclable and retains the performance of the main substrate.

The method of making a tray described in this disclosure reduces the amount of barrier material, adhesives, even with regrind present in the container, so the main substrate is well above 95%. This is accomplished because the coatings are used rather than extruded barrier resins and their tie layer adhesives. Barrier and adhesive coatings are so efficient that vanishingly small amounts can deliver the required barrier and adhesive properties. The barrier coating can be combined with an adhesive coating without compromising the adhesive or the barrier to an extent that prevents its utility in thermoforming. The entire coating layer thickness may be under 2 microns in a 1000 micron thick of sheet. That represents 0.2% of the total structure thus insuring that 99.8% of the structure is the primary substrate, in this example.

BRIEF SUMMARY OF THE INVENTION

This disclosure relates to a food tray, a sheet for making a food tray and a method of making a food tray. The sheet maintains its oxygen barrier properties during thermoforming and retorting due to coating the metal oxide layer of the sheet with a copolymer layer. The copolymer layer can patch any cracks or openings that occur due to metal oxide cracking when the sheet is thermoformed into the tray. In addition, the tray has a high recycling value because the tray is considered a single material that is recyclable and retains the performance of the main substrate.

In one aspect a first sheet for making a food tray or other article is provided. The sheet comprises a substrate and a laminate film. The laminate film comprises a ceramic film and a copolymer layer. The ceramic film comprises a polyolefin film coated with a metal oxide. The polyolefin film may be polypropylene (PP). The metal oxide may be AlOx, SiOx or any suitable metal oxide. The copolymer layer may comprise aqueous polyvinyl alcohol (PVOH) copolymer, and may further comprise an aqueous polymeric adhesive.

In another aspect a retortable tray for holding food is provided. The tray defines an interior and has an outer side and an inner (food contacting) side. The tray wall comprises a ceramic film layer, a copolymer layer and a substrate. The ceramic film layer comprises a metal oxide coated polyolefin film where the metal oxide coating is resistant to retort conditions. Metal oxide coated polyolefin films have important properties that vary by grade, depending on tray service conditions. The copolymer layer comprises a polyvinyl alcohol (PVOH). The substrate comprises a polymer selected from the group consisting of polypropylene (PP), polyethylene terephthalate (PET), polyethylene (PE) and polystyrene (PS). For retort resistance, PP is the most preferred due to its known heat and moisture resistance to retort conditions. The substrate comprises about 98 wt % of the tray 50. The copolymer layer may also comprise a water soluble adhesive component which sticks to the main substrate used in the tray. The water soluble adhesive must bond with the substrate. One adhesive typically cannot adhere to all substrates. Suitable water soluble adhesives can be selected from several chemical classes such as: polyethylene imines (PEI), polyurethanes and polyepoxides, to name three. Each chemical class has subclasses with important properties affecting adhesion, viscosity, biodegradation, resistance to moisture attack, to name a few.

In another aspect the disclosure relates to a method of making a tray, the method comprising the steps of: extruding a multilayer PP sheet while laminating to it a film comprised of a ceramic film layer that is also coated with copolymer film and adhesive, the ceramic film layer comprising a PP film layer and a metal oxide layer; bonding the laminate film to the substrate under heat and pressure to form a sheet; and thermoforming the sheet to form the tray.

In another aspect a second sheet for making a food tray or other article is provided. The second sheet comprises a dual barrier laminate film, a substrate and a cap layer. The dual barrier laminate film comprises a copolymer layer sandwiched between two ceramic film layers.

In another aspect a third sheet for making a food tray or other article is provided. The sheet has a non-metal oxide construction and comprises a substrate and a laminate film. The laminate film comprises a copolymer layer and a polyolefin film such as polypropylene (PP). The copolymer layer may comprise aqueous PVOH copolymer and may further comprise an aqueous polymeric adhesive.

In another aspect a fourth sheet for making a food tray or other article is provided. The fourth sheet comprises an asymmetric barrier sheet and a PP cap layer. The asymmetric barrier sheet comprises a symmetric barrier core and an extruded PP sheet. The addition of a PP substrate to the opposite side of the sheet makes it symmetrical from the centerline outward in that both sides are mirror images of each other. The symmetrical sheet has an advantage because it will heat uniformly from both sides of the sheet in a forming oven. This insures the best outcome for even material distribution, inclusive of the barrier components in the formed tray. The barrier core comprises a PP substrate sandwiched between two laminate films. Each laminate film comprises a ceramic film and a copolymer layer.

DETAILED DESCRIPTION OF THE INVENTION

While the disclosure described herein may be embodied in many forms, there is shown in the drawings and will herein be described in detail one or more embodiments with the understanding that this disclosure is to be considered an exemplification of the principles of the disclosure and is not intended to limit the disclosure to the illustrated embodiments. Aspects of the different embodiments can be combined with or substituted for one another.

This disclosure relates to an improved sheet for making a thermoformed, retortable food package. The disclosure also relates to a three-dimensional article for holding food, such as a food tray. Finally, the disclosure also relates to a method of making a three-dimensional article such as a food tray.

STATE OF THE ART

Thermoforming is a manufacturing process wherein a plastic sheet is heated to a pliable forming temperature and formed in a mold to a specific shape (such as a tray). The sheet, or "film" may be heated in an oven to a temperature that permits the sheet to be stretched into or onto a mold and cooled to a finished shape.

In food applications, the thermoformed tray must be able to withstand handling and filling conditions. Filling conditions can vary. The trays can be filled at room temperature, hot filled at 180° F. (82.2° C.), or pasteurized and sterilized in a retort process. The technology of this application covers all filling conditions described. The most extreme is the retort process. The food is first prepared and then placed into the tray. A lidding film is sealed to the top edge of the tray.

Figure 1:
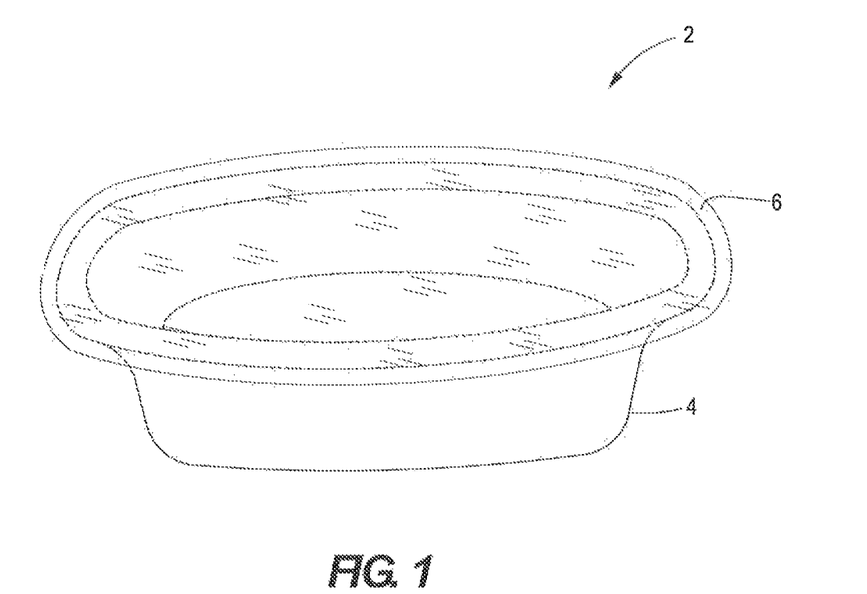
FIG. 1 is a top perspective view of a container.
Figure 2:
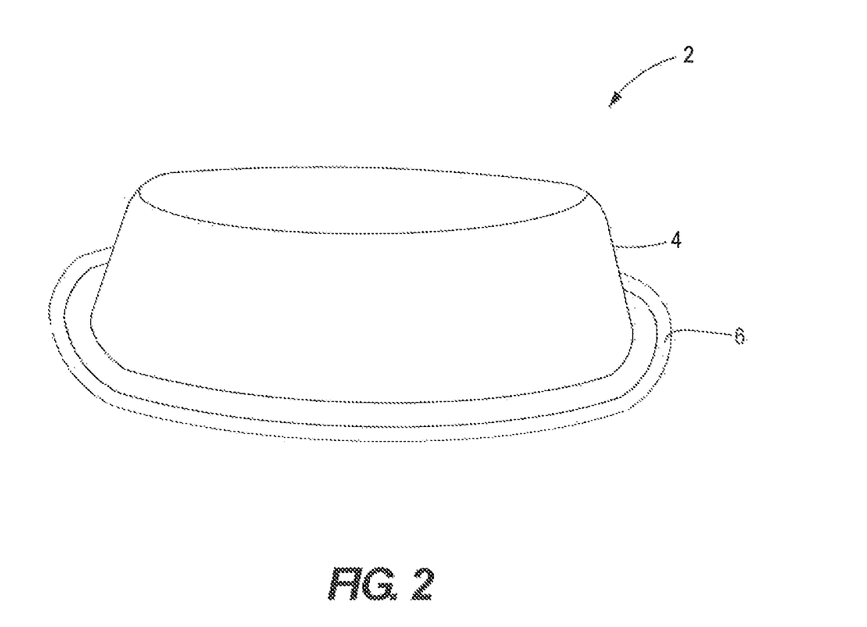
FIG. 2 is a bottom perspective view of the container of FIG. 1.

FIG. 1 is a top perspective view and FIG. 2 is a bottom perspective view of a conventional container 2 for holding food and other contents. The container 2 comprises a tray 4 sealed with a lidding film 6. The container 2 may be heated to a sterilization temperature, perhaps 240-250° F. (116-121° C.) and kept there for several minutes under high pressure. This process reliably kills all commonly occurring microorganisms (particularly *Clostridium botulinum*), preventing the food from spoiling.

A typical retortable tray comprises one or more layers of polypropylene (PP) and EVOH and tie layers. In this application a laminated sheet having a metal oxide layer for use as an oxygen barrier may be used. Unfortunately, when the laminated sheet with metal oxide is stretched during thermoforming, the metal oxide will crack, rendering it less effective as an oxygen barrier.

The solution presented herein is to coat the metal oxide side of the sheet with a barrier copolymer and adhesive coating. The copolymer with adhesive can "patch" any cracks or openings that occur due to metal oxide cracking when the film is formed into the tray sidewall.

First Embodiment

Figure 3:
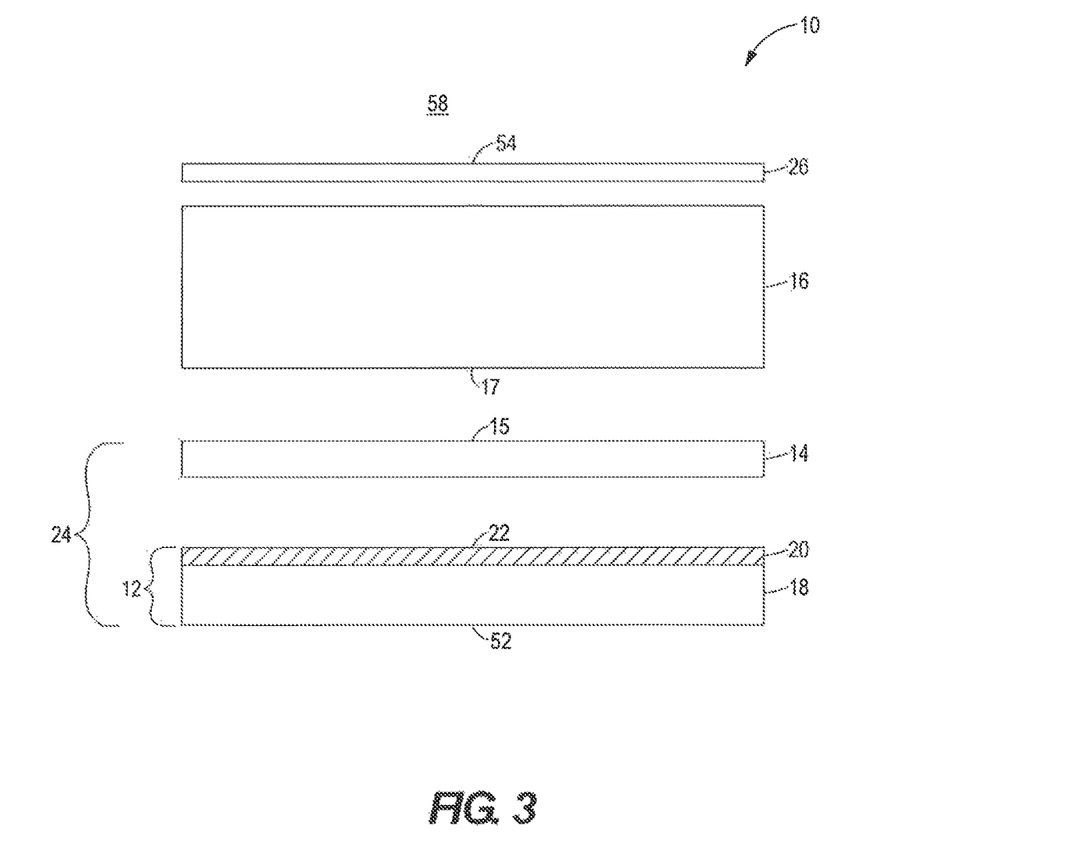
FIG. 3 is a sectional view of a first embodiment of a sheet according to the disclosure.

FIG. 3 is a sectional view of a sheet 10 for making a food tray 50 or other article according to the disclosure. In one aspect of the disclosure, the sheet 10 comprises a substrate 16 and a coated film 24 comprising a ceramic film 12 that is coated with copolymer layer 14. The substrate 16 may be any suitable thickness (1000 microns thick for example). The substrate 16 provides structural integrity to the tray 50 and, in the case of polyolefin substrates, provides a moisture barrier. The coated film 24 provides oxygen and moisture barrier properties. A cap layer 26 may be added to the sheet 10 before it is formed into a tray 50 as explained below. The ceramic film 12 can be thermoformed but can lose its barrier properties when stretched (as during thermoforming) because voids can form in its metal oxide layer 20. Thus, the copolymer layer 14 is used to plug the voids.

The ceramic film 12 may comprise a polyolefin film 18 such as polypropylene (PP) coated with a metal oxide 20 such as aluminum oxide (ALOx) or silicon oxide (SiOx). Preferably the coated film 24 is bonded or otherwise applied to the outer facing side 17 of the substrate 16, that is, the side 17 that will face away from the interior 58 of the tray 50 (see FIG. 5).

The ceramic film 12 may comprise a PP film layer 18 approximately 50 microns thick and coated with a metal oxide layer 20. The inner, substrate facing side 22 of the metal oxide layer 20 is laminated to or otherwise bonded to the copolymer layer 14 such as with an adhesive component to achieve the coated film 24.

The copolymer layer 14 preferably is a mixture of aqueous PVOH copolymer and aqueous polymeric adhesive (such as polyethylene imine (PEI), epoxide polymer or polyurethane). Alternatively, a more complex construction is required, for example 'AlOx-adhesive-PVOH-adhesive', so the adhesive can seal against the PP substrate 16. However, it is preferable to blend adhesive into PVOH and then coat the AlOx because it simplifies the construction and doesn't degrade the barrier appreciably.

The sheet 10 and tray 50 have an outer side 52 and an inner (food contacting) side 54.

The coated film 24 may be welded or otherwise affixed to the extruded PP substrate 16 under heat and pressure typical of a conventional sheet extrusion line at the nip of the chrome roll. The sheet 10 can then be thermoformed into a three-dimensional object such as the tray 50 shown in FIG. 5.

As noted above, the metal oxide layer 20 may crack during the stretching that can occur during thermoforming. However, the copolymer layer 14 will seal the cracks 82 that otherwise could result in oxygen migration through the tray 50. Overall, that tray 50 will not only have the benefit of the inherent properties of the substrate 16 comprising over 98% of the structure but will take on much of the oxygen and moisture barrier benefit of the metal oxide layer 20 and the oxygen barrier benefit of the copolymer layer 14. Additionally, the metal oxide layer 20 will help to further protect the copolymer layer 14 from moisture attack during steam sterilization at those locations where the metal oxide layer 20 remains intact.

Second Embodiment

Figure 4:
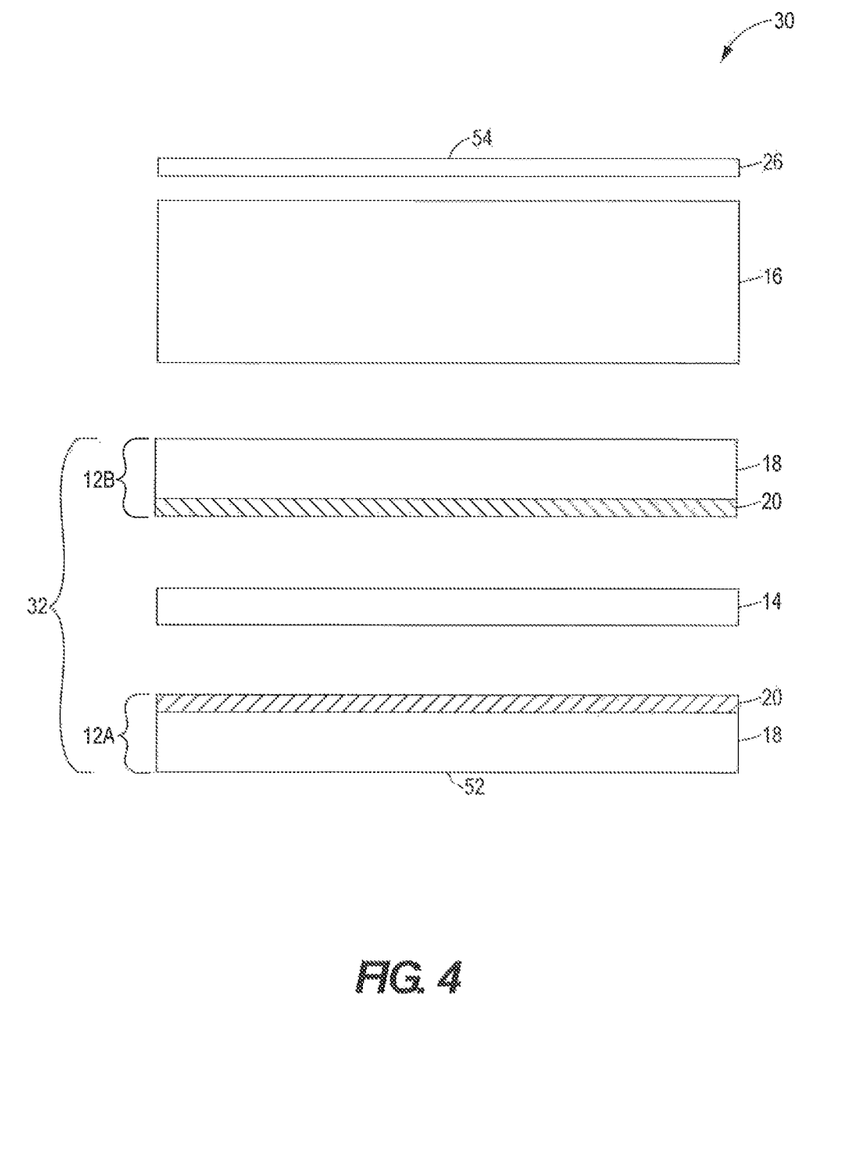
FIG. 4 is a sectional view of a second embodiment of a sheet according to the disclosure.

An even more effective sheet construction is shown in FIG. 4. The sheet 30 comprises a dual barrier laminate film 32, a substrate 16 and a cap layer 26. The dual barrier laminate film 32 comprises a copolymer layer 14 sandwiched between two ceramic film layers 12A, 12B. The dual barrier laminate film 32 may be thermally welded or otherwise bonded to the substrate 16. The sheet 30 has an outer side 52 and an inner (food contacting) side 54 defined by the cap layer 26.

From outermost layer to innermost layer, the sheet 30 may comprise: a 50 micron thick PP film 18 with an AlOx coating 20, a PVOH copolymer layer 14 with adhesive(s), an AlOx coating 20 on a 50 micron PP film layer 18, a 1,000 micron PP substrate 16 and a cap layer 26. These layers seal together well enough to thermoform. The ceramic film layers 12A, 12B will "bracket" the PVOH copolymer layer 14 in such a way as to protect the PVOH copolymer layer 14 from steam retort moisture attack, as well as migration of moisture from wet food at the sites where the metal oxide layer 20 remains intact.

Alternatively, a SiOx coated PP ceramic film 12 can be incorporated into the sheet in a similar manner as the AlOx coated PP ceramic film 12 with similar benefits. Since the ceramic films 12 and the PVOH-adhesive copolymer layer 14 are so thin, and since their substrates are PP, the tray is recyclable by the definitions provided in this disclosure.

The Tray 50

Figure 5:
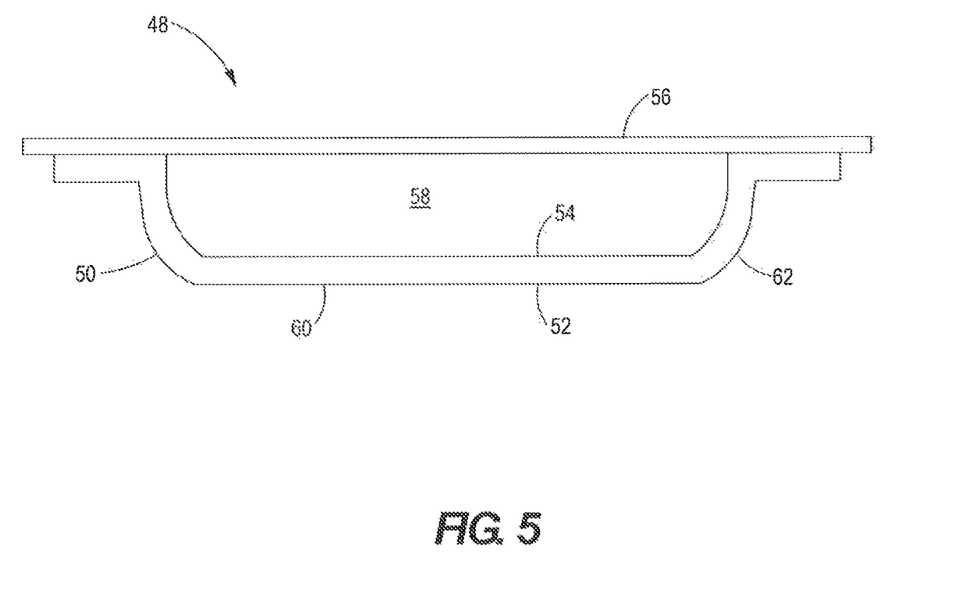
FIG. 5 is a cross-sectional view of a tray according to the disclosure.

FIG. 5 is a cross-sectional view of a container 48 according to the disclosure. The container 48 comprises a tray 50 and a lidding film 56. The tray 50 is sealed with the lidding film 56. The tray 50 defines an interior 58 for holding food or other contents (not shown). The tray 50 has an outer side 52 and an inner (food contacting) side 54.

As better shown in FIGS. 3 and 4, the bottom and side walls of the tray 50 may comprise, from the outer side 52 in, a ceramic film layer 12, one or more copolymer layers 14, and a substrate 16.

The Substrate 16

The substrate 16, or core, provides the tray 50 with structural integrity. Substrates 16 that can take advantage of the coated films 24 and laminated films 32 disclosed herein include, without limitation, polypropylene (PP), polyethylene terephthalate (PET), polyethylene (PE), polystyrene (PS), and metals and metal oxide coated polyolefin films.

PET may be a desired substrate for its availability as a post-consumer sourced resin, stiffness, clarity or other properties. Polypropylene (PP) is especially desired if the tray is to be used in steam retort sterilization and requires good contact clarity. Polypropylene is heat resistant enough to allow for 270° F. (132.2° C.) retort. PP is also moisture migration resistant and seals well to existing lidding technology for retortable trays. PP from the substrate 16 and from the PP film layers of each of the coated films 24 and laminated films 32 may comprise about 98% of the retortable tray 50. This allows the tray 50 or other article to be classified as mono-material and recyclable.

The Ceramic Film 12

The ceramic film 12 may comprise a metal oxide layer 20 coating a polyolefin film 18. The metal oxide layer 20 may be a silicon oxide (SiOx), an aluminum oxide AlOx or any suitable metal oxide. Ceramic coated films are nearly perfect barriers to oxygen and moisture. They can readily laminate to polyolefin films when the right substrate and mix of copolymer and adhesive coating is used.

The Copolymer Layer 14

The copolymer layer 14 may comprise a polyvinyl alcohol (PVOH) and its copolymers with acetyl moieties and ethylene. PVOH copolymers are excellent oxygen barriers, requiring only very thin films to meet oxygen protection requirements of certain foods. A desirable coating with good barrier stability to moisture will contain a copolymer of PVOH like the Exceval™ modified polyvinyl alcohol available commercially from Kuraray Co, Ltd.

PVOH copolymer is very difficult to extrude or co-extrude in the melt phase because the PVOH will degrade close to its melting temperature. It is also very difficult to control the thickness of the PVOH copolymer or adhesive melt to such low levels as this disclosure claims. Thus, extrusion can be bypassed by using aqueous dispersions of these to coat the substrate 16.

The copolymer layer 14 may also comprise a water soluble adhesive component which sticks to the main substrate 16 used in the tray 50, and possibly a crosslinking additive. Water soluble adhesives can include polyethylene imine (PEI), polyurethanes and epoxide polymers, all of which are readily available.

Optional crosslinking agents are available commercially as well and may also have adhesive qualities. These will crosslink the PVOH copolymer to further improve water stability. Crosslinking agents can also be added to the adhesives to improve bonding of the adhesive to the substrate.

These copolymer compositions are well known for making barrier films, particularly for making barrier films with a degree of moisture resistance that allows them to have good O2 barrier properties, even at high levels of humidity (up to 70% Relative Humidity (RH)). Especially important, these materials and their compositions are available in coating solutions and, more preferably, aqueous solutions, so they can be coated onto a suitable substrate (such as a ceramic film 12) without the need to be melted and extruded. They now become available to rigid thermoforming due to this disclosure.

Especially useful is the ability of a properly formulated copolymer layer 14 to act as both an adhesive and an oxygen barrier to many substrates and to themselves. Once applied to substrates in a sheet format, the copolymer layers 14 can be stacked together and sealed to make a single multi-layer composite, such as that shown in FIG. 8. Endless constructions can be made, such as constructions of PP to PET or PE to high impact polystyrene (HIPS) or PP to PP and PET to PET. Since 95% or more of the tray 50 or other article must be the primary substrate component (eg. PP) for the tray 50 or other article to be recyclable, compositions of PET and PP or PE and PP may fall short of that threshold if the non-primary substrate component (minor resin) tends to be more than 5% of the overall composition. The same holds true for alloys of polymer mixtures. Compositions of coated PP welded to PP or coated PP can meet the recycling requirement if the primary substrate component of the tray 50 or other article is 95% or greater. This is true irrespective of the grade of PP, so multiple grades of PP can be in the same tray 50 or article and still meet the recyclability requirement.

Surprisingly, barrier coated PP that is properly bonded to PP or coated PP or metal oxide coated PP in many configurations will be thermoformable and provide excellent barrier properties. Layers will not delaminate in the oven of the thermoformer and the layers will not slide by one another when thermoforming, thus allowing excellent quality parts to form. PVOH copolymer which forms a more flexible film is desired in a rigid thermoformed container such as a tray 50. This is more important to a rigid container than a film, since the container, if squeezed, can cause the internal barrier to crack. If the coating cracks it will lose much of its oxygen barrier properties. Film is not typically squeezed in this way, so film can use stiffer and more brittle PVOH copolymers. Examples of two suitably flexible PVOH copolymers are Exceval™ AQ4104 and HR3010 from Kuraray. PVOH homopolymer is also suitably flexible. Stiffness, stretchability and tensile modulus can be adjusted with plasticizers such as propylene glycol and crosslinking agents such as glycerin and glutaraldehyde. They differently effect Exceval compared to PVOH homopolymer, thus requiring custom formulation to produce ideal physical properties leading to improved barrier, especially when the coating is stretched more when molding a deeper barrier tray.

Adherence of Copolymer Layer 14 to the Ceramic Film 12

Of particular interest is the ability of these copolymer layers 14 to adhere to metals and metal oxides such as AlOx, SiOx and the like. Ceramic films 12, such as AlOx coated PP film, available commercially and typically used as lidding films having high moisture and oxygen barrier properties, can adhere to PP film or PP sheets. For example, AlOx coated PP ceramic film 12 can adhere via thermal lamination of the PP film 18 side of the ceramic film 12 to a PP sheet or to the metal oxide (AlOx) layer 20 of another ceramic film 12. If the metal oxide (AlOx) layer 12 is sandwiched between PP layers it becomes resistant to scratching and subsequent loss of moisture and oxygen barrier properties. This is known to the film industry. In fact, the film industry can also coat the AlOx layer with similar coatings disclosed in this disclosure. However, that has not been useful for making rigid containers in three dimensional shapes because the film will lose its barrier properties when stretched into a shape such as a tray shape.

We have discovered that if the AlOx layer 20 side of the ceramic film 12 is coated with copolymer layers 14 according to this disclosure, the ceramic film 12 can be sealed against a much thicker sheet of substrate 16 and thermoformed into a tray 50 having excellent oxygen and moisture barrier properties. The AlOx layer 20 may be a micro-thin layer as is the aqueous barrier and adhesive coating, so they comprise a very small percentage of the tray 50, insuring the substrate 16 is well over 95% of the total tray. Additionally, the substrate 16 retains its inherent value so that it is worth recovery, purification and reselling to higher end markets. This makes the tray 50 truly recyclable by current definitions.

Certain adhesives, like PEI, can oxidatively yellow when raised to required lamination temperatures. We have learned that when the adhesive layer is coated with an oxygen barrier coating like a barrier copolymer, it shields the adhesive from thermal oxidative attack, thus eliminating yellowing. If yellowing must be avoided, then a coating of copolymer can be applied over the adhesive or adhesive mixture coating prior to thermal lamination. For this to laminate to a substrate, it must have a similar structure and the barrier copolymer layers must face one another in order for thermal lamination to create an effective bond between the layers. Surprisingly, in-line thermal lamination of a copolymer or homopolymer coating to a hot substrate reduces the tendency for yellowing even if PEI is mixed with PVOH rather than over coated.

Clay or Silica Additives

Existing patents relating to PVOH and its copolymers and adhesives teach modifying the composition with clay or silica to improve barrier performance even more. It is not outside the scope of this disclosure to accommodate that technology when made available.

Cap Layer 26

The tray 50 may comprise a cap layer 26, typically comprising virgin polypropylene, between the food and any recycled PP material 16.

Prevention of Loss of Barrier Properties Due to Stretching

Ceramic films 12 can be thermoformed, but will lose their barrier properties because voids can form in the metal oxide layer 20 when stretched. The areas where the ceramic film 12 is still attached to the polyolefin substrate 16 will continue to block moisture and oxygen. However, the voids 82 in the metal oxide layer 20 of the ceramic film 12 will allow moisture and oxygen to permeate the ceramic film 12 unless plugged somehow. For this reason, at least one copolymer layer 14 is incorporated into the sheet 10.

Figure 6:
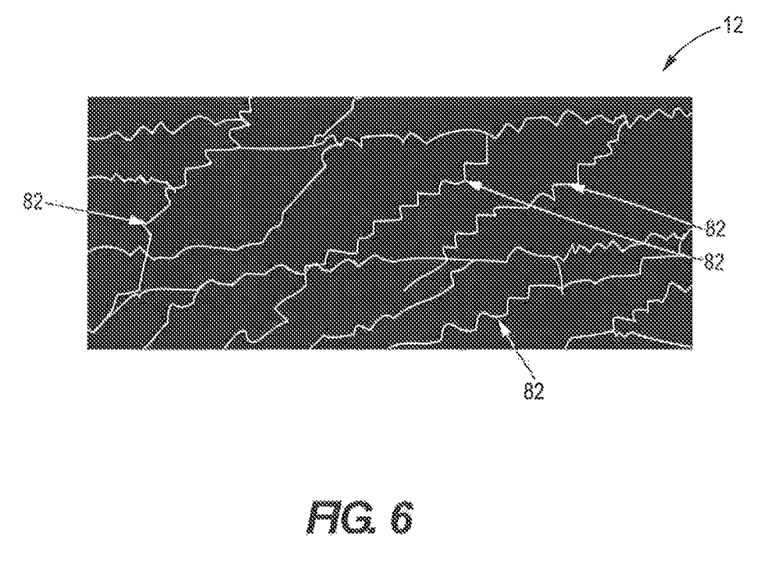
FIG. 6 is a microscopic depiction of a portion of a tray in which the metal oxide layer 20 has developed cracks.

FIG. 6 is a microscopic depiction of a ceramic film 12 in which the metal oxide layer 20 has developed cracks 82. According to this disclosure the cracks or other voids 82 can be filled or plugged by the copolymer layer 14.

Figure 7:
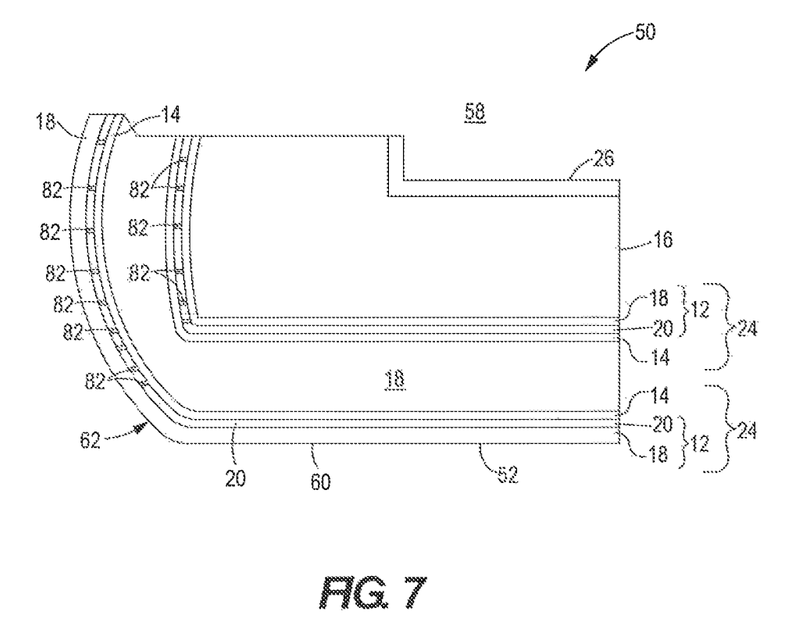
FIG. 7 is a partial cross-sectional view of a tray in which the metal oxide layer has developed cracks in certain areas.

FIG. 7 is a schematic diagram of a tray 50 comprising two layers of ceramic film 12. From the outer side 52 in, the tray 50 comprises a first ceramic film layer 12, a first copolymer layer 14, a polyolefin (such as PP) film layer 18, a second copolymer layer 14, a second ceramic film layer 12, a substrate layer 16 and a cap layer 26. The metal oxide layer 20 of the ceramic film layers 12 has cracked where the sheet has been stretched to form the tray sidewall 62, but stays more intact where the sheet forms the relatively flatter tray bottom 60.

Figure 8:
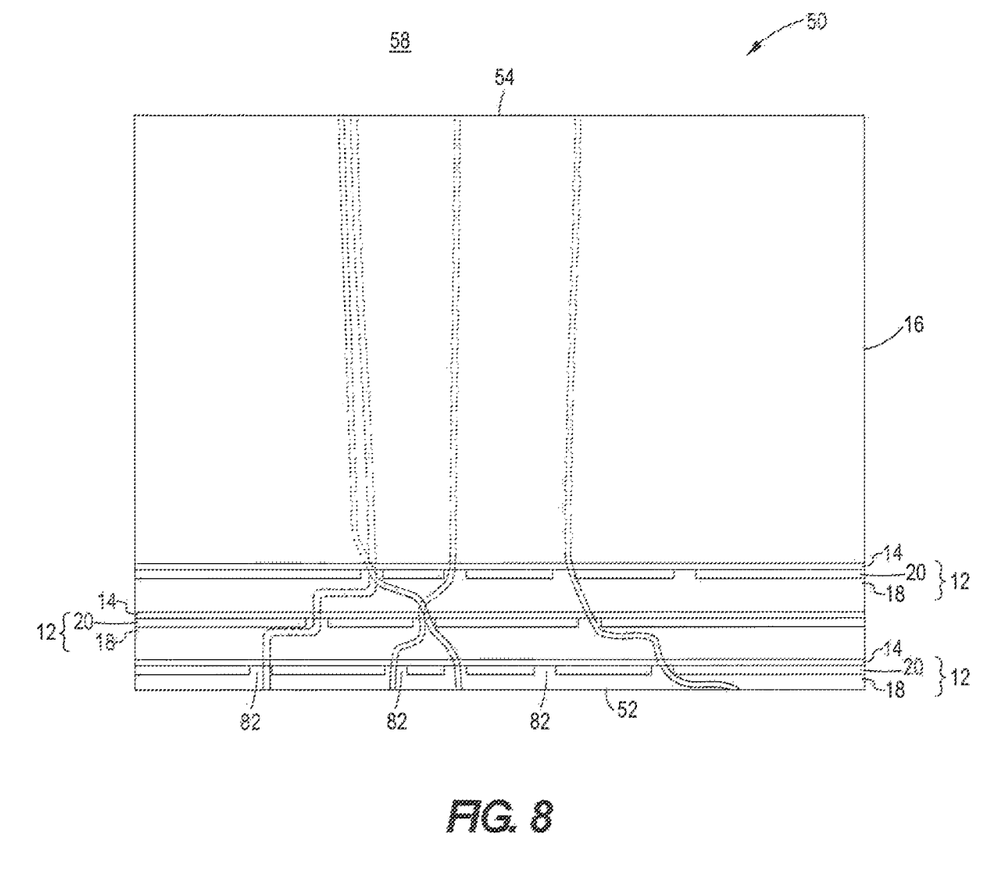
FIG. 8 is another partial cross-sectional view of a tray in which the metal oxide layer has developed cracks.

FIG. 8 is another schematic diagram of a tray 50 in which the metal oxide layers 20 have developed cracks 82, and illustrates the advantage of multiple ceramic film layers 12. The tray 50 comprises multiple ceramic film 12 layers and multiple copolymer layers 14, so even without sealing the cracks 82, the tray 50 forms tortuous paths for oxygen to enter the tray interior 58. The copolymer layer 14 seals the cracks 82, providing a further barrier to oxygen migration.

Method of Making a Sheet

Figure 9:
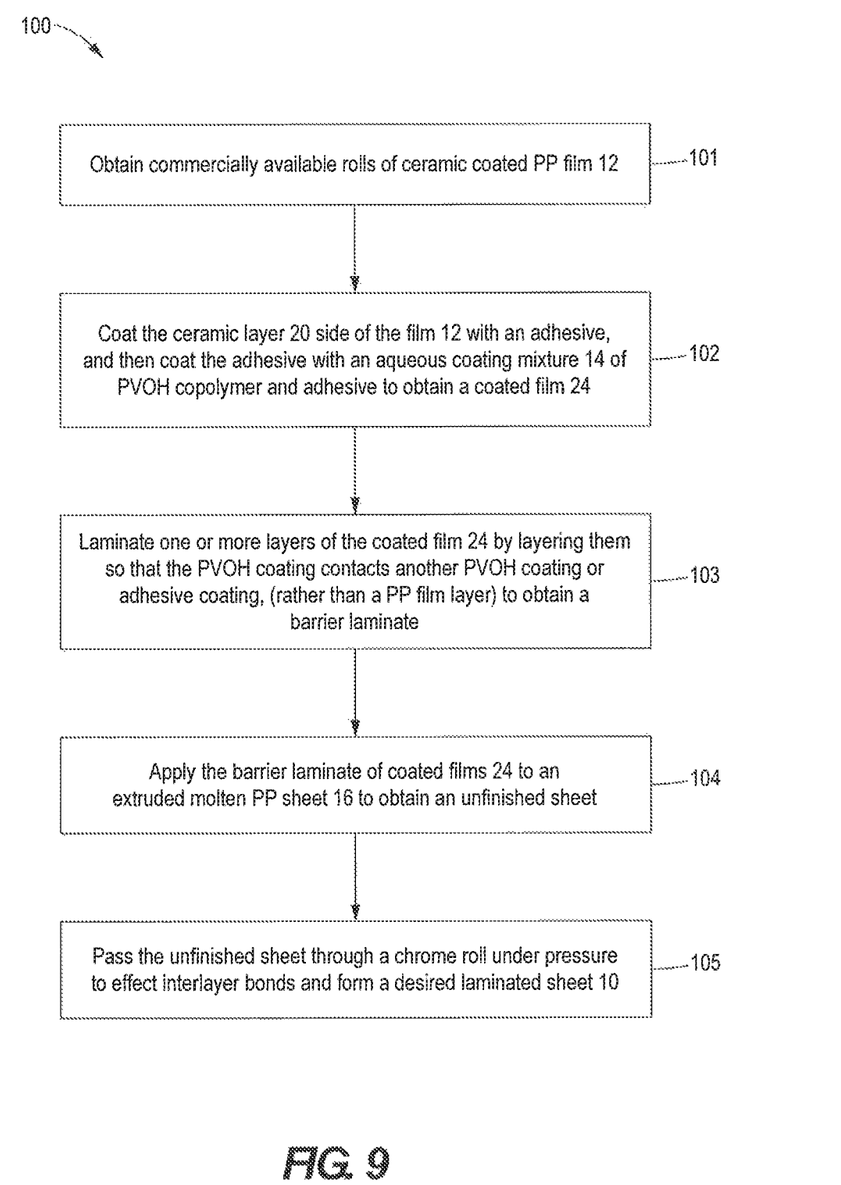
FIG. 9 is a flowchart showing steps in the manufacture of a sheet according to the disclosure.

In another aspect the disclosure relates to a method of making a sheet that may be thermoformed into three-dimensional article such as a food tray. Referring to FIG. 9, a process 100 of making a sheet may comprise the following steps:

Step 101: Obtain commercially available rolls of ceramic film 12, such as AlOx coated PP film 12 of 50 microns (2 mil) thickness. Corona treat the metal oxide side 20 of the ceramic film 12 (if needed).

Step 102: Coat the metal oxide side 20 of the ceramic film 12 with a copolymer layer 14, such as an aqueous coating mixture of barrier copolymer PVOH and adhesive so that, when dry, the result is a coated film 24 about 1 micron thick.

Step 103: Laminate the one or more of the coated films 24 together to create a barrier laminate. This step may be facilitated by first placing three rolls of the coated AlOx film 24 onto 3 unwinders placed before the chrome roll and out of the way of equipment.

The lamination step 103 can be done on a sheet extrusion line or on a thermal lamination system. During this step any copolymer layer 14 may be buried (laminated) between PP film layers 18 to protect the copolymer layer 14 from excessive water intrusion.

Step 104: Apply the barrier laminate of coated films 24 onto a substrate 16 such as a molten PP sheet of about 650 micron thickness (25 mil) (aka extruding sheet) to obtain an unfinished sheet. This step may be facilitated by arranging the rolls of coated film 24 so that the copolymer layers 14 of PVOH and adhesive all face towards the substrate 16, then co-feeding all three rolls of coated film 24 into nip rollers where they will meet the molten PP sheet and bond thereto under heat and pressure from the nip roller.

Step 105: Pass the unfinished sheet through a chrome roll under pressure to effect interlayer bonds and form a sheet of about 800 microns thickness (about 31 mil). The sheet may comprise three layers of 2 mil thickness (6 mil total) barrier film 24 and a PP substrate 16 layer of about 25 mil thickness.

The laminated (coated polymeric) sheet 24 can be thermally bonded (heat may be applied via more than one method) to the substrate 12 under pressure using typical extrusion equipment such as extrusion chrome rolls or forming preheater chrome rolls. One method may include laminating the coated film 24 onto a molten, extruding substrate sheet 16 at the point of entering the chrome roll stack. An offline lamination system can do this as well. Or the coated film 24 can be adhered to the substrate 16 in a sheet preheater prior to the oven for thermoforming. This process flexibility is advantageous. The sheet may then be thermoformed into a tray or other three dimensional article.

Third Embodiment

Figure 10:
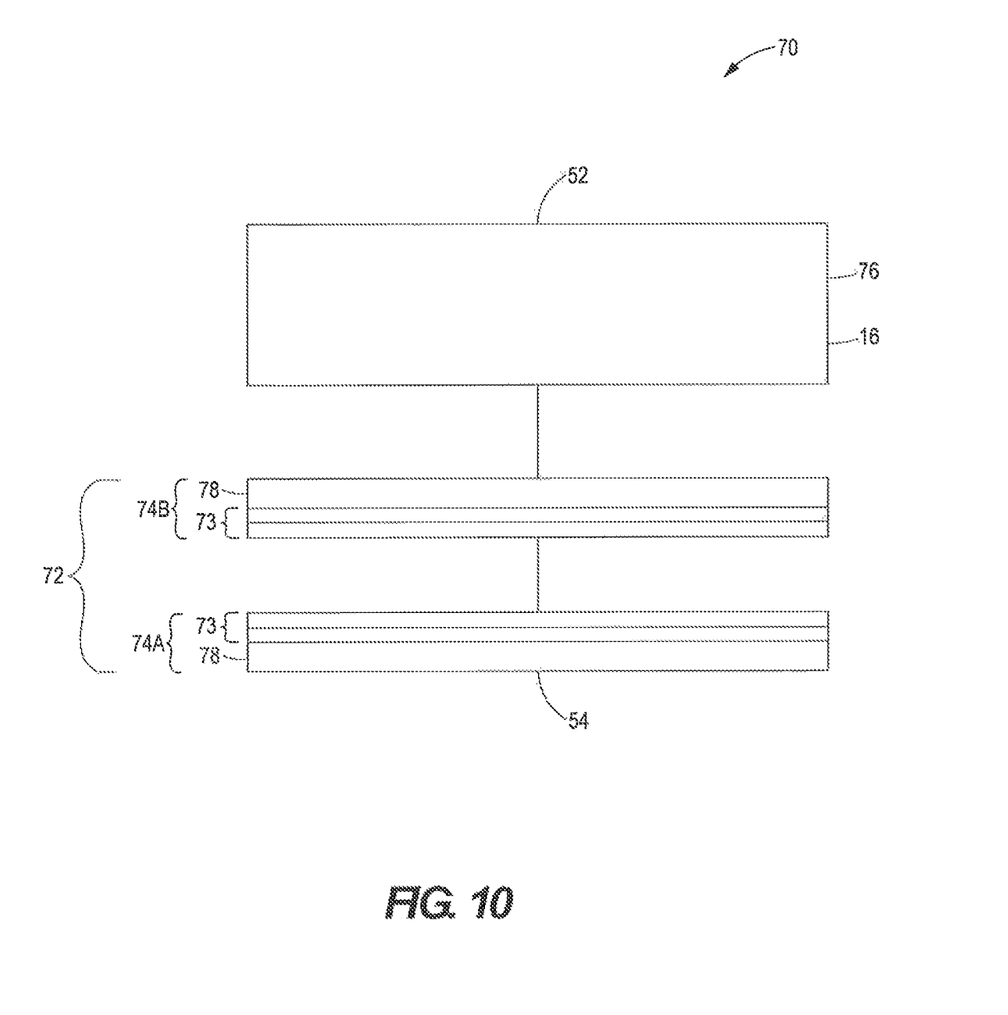
FIG. 10 is a sectional view of a third embodiment of a sheet according to the disclosure.

FIG. 10 is a sectional view of a third embodiment of a sheet 70 according to the disclosure. In this embodiment, the sheet 70 has a non-metal oxide construction. The sheet 70 comprises a PP substrate 76 and a laminate film 72. The PP substrate 76 may comprise one or more layers of PP. The laminate film 72 comprises a first substrate film 74A and a second substrate film 74B. Each substrate film 74 may comprise a PP substrate film 78 and one or more adhesive coated aqueous PVOH copolymer layers 73. The sheet 70 has an outer side 52 and an inner (food contacting) side 54.

The sheet 70 may be made by extruding a substrate 76; creating a laminate film 72 by joining on copolymer layer 74 to another copolymer layer 74, without a ceramic coated film present; bonding the first and second copolymer layers 74 together to form the laminate film 72; then bonding the laminate film 72 to the substrate 76 to make a sheet 70.

Figure 11:
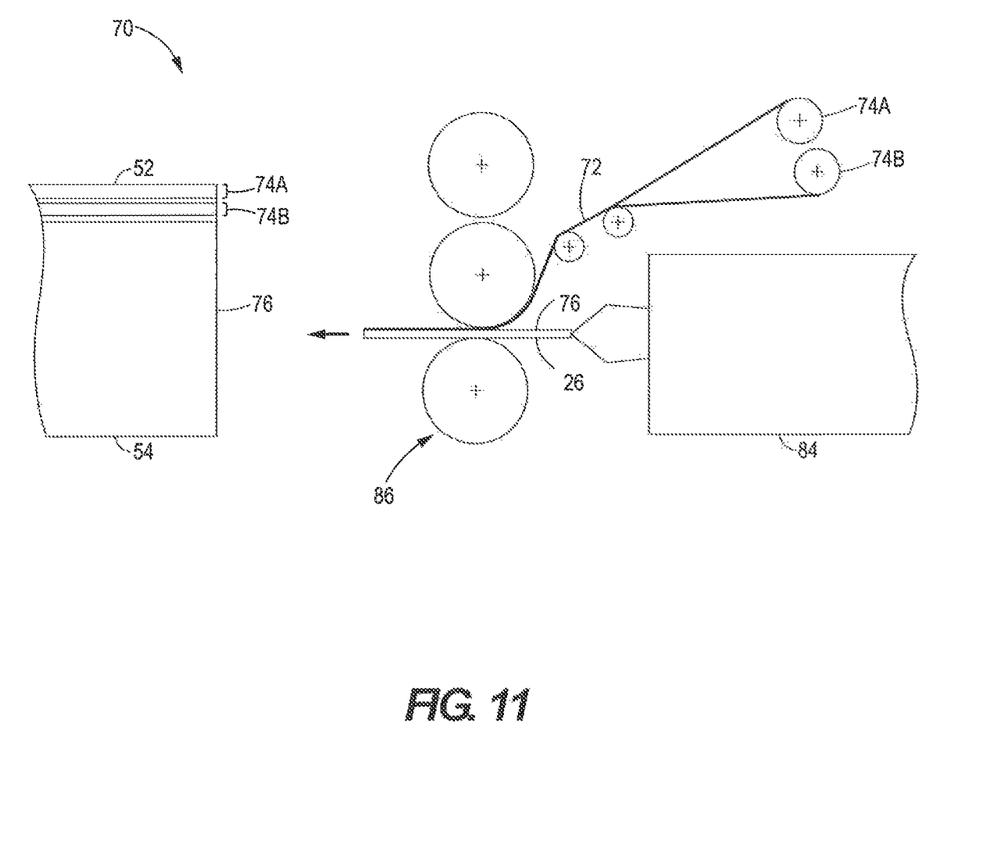
FIG. 11 is a schematic diagram of a manufacturing process for making the sheet of FIG. 10.

FIG. 11 is a schematic diagram of a manufacturing line for making the sheet 70. An extruder 84 may extrude the substrate 76 and an optional cap layer 26. Concurrently, the laminate film 72 is created by joining one copolymer layer 74A to another copolymer layer 74B, without a ceramic coated film present, then bonding the first and second copolymer layers 74A, 74B together to form the laminate film 72. Next, the laminate film 72 is bonded to the substrate 76 to make the sheet 70. This may be accomplished by feeding the laminate film 72 and substrate 76 into a chrome roll nip/sheet die 86 per FIG. 10. The PVOH copolymer and adhesive layers 73 will be buried between the PP substrate layers 76 to protect the PVOH copolymer and adhesive layers 73 from excessive moisture during and after retort sterilization. The PVOH copolymer and adhesive layers 73 will become tie layers due to the adhesive properties of the appropriate adhesive to silica.

Each substrate film layer 74 may be 2 microns thick.

The PP substrate layer 76 can be any thickness as long as it can convey enough heat to bond the substrate film layers 74 to one another and to the molten PP substrate 76.

In summary, the sheet 70 shown in FIG. 10 is a preferred structure in which two coated PP film layers 78 are laminated together with mixed PVOH copolymer+PEI adhesive layers 73, mixed in one solution, on facing sides, providing a superior O2 barrier.

Fourth Embodiment

Figure 12:
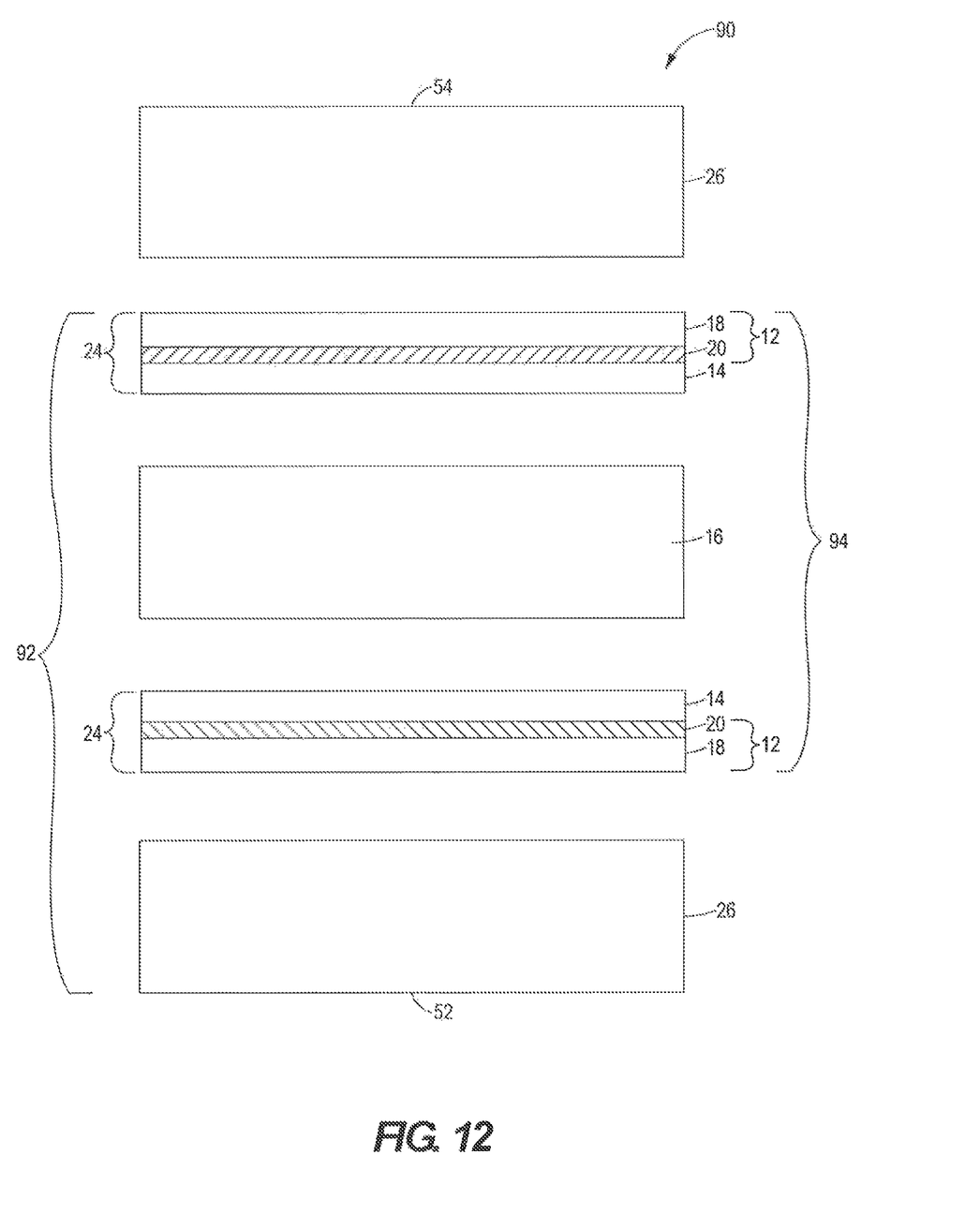
FIG. 12 is a sectional view of a fourth embodiment of a sheet according to the disclosure.

FIG. 12 is a sectional view of a fourth embodiment of a sheet according to the disclosure. The sheet 90 comprises an asymmetric barrier sheet 92 and an optional PP cap layer 26. The asymmetric barrier sheet 92 comprises a symmetric barrier core 94 and an extruded PP substrate 16. The barrier core 94 comprises a PP substrate 16 sandwiched between two coated films 24. Each coated film 24 comprises a ceramic film 12 and a copolymer layer 14. The ceramic film 12 may comprise a polyolefin film 18 such as polypropylene (PP) coated with a metal oxide 20 such as AlOx or SiOx. The sheet 90 has an outer side 52 and an inner (food contacting) side 54. The cap layer 26 forms the inner (food) facing surface of the sheet 90.

Figure 13:
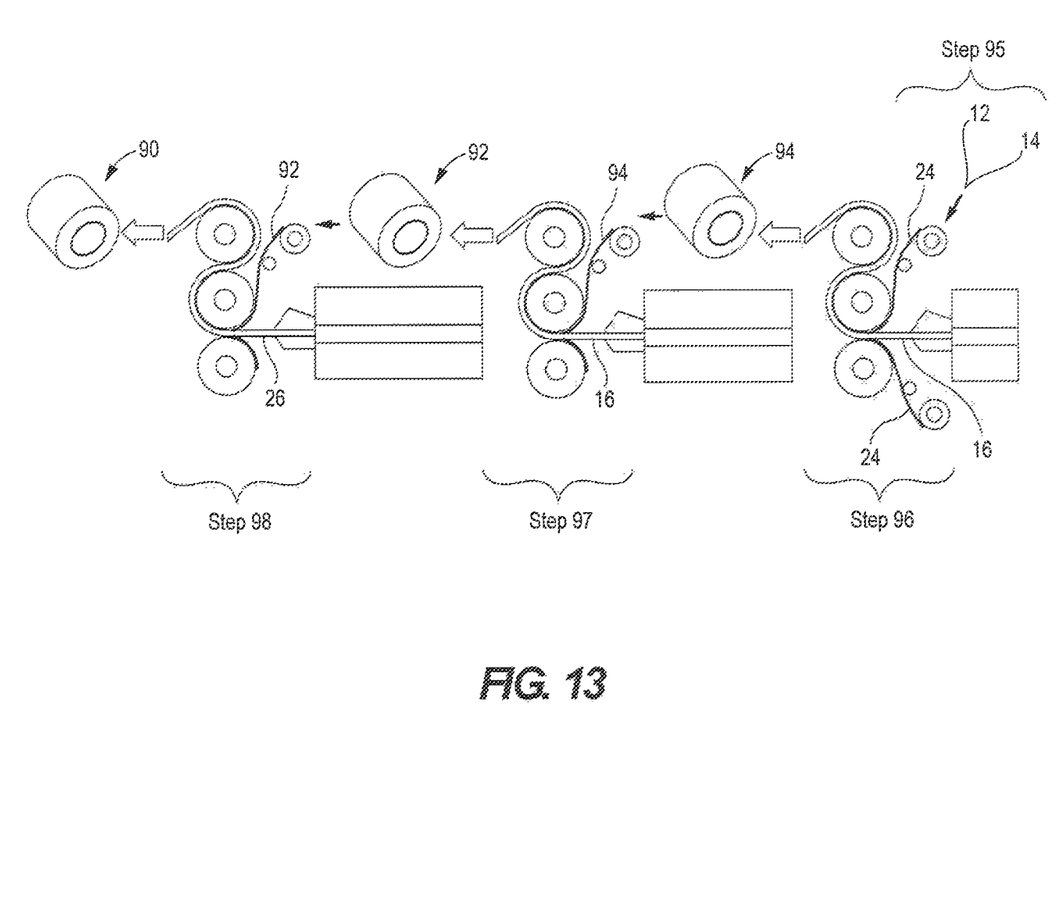
FIG. 13 is a schematic diagram of a manufacturing process for making the sheet of FIG. 12.

FIG. 13 is a schematic diagram of a manufacturing process for making the fourth sheet 90.

In a first step 95, coated film 24 is made by coating a ceramic film 12 with a copolymer layer 14. The copolymer layer preferably includes an adhesive.

In a next step 96, the coated film 24 is applied to each side of an extruded PP substrate 16 to form a barrier core 94. Preferably the copolymer adhesive layer 14 of each coated film 24 faces the substrate 16.

In a next step 97, the barrier core 94 is laminated or otherwise bonded to another substrate layer 16 to form the asymmetric barrier sheet 92.

In a final step 98, the asymmetric barrier sheet 92 is laminated or otherwise bonded to a cap layer 26 to form the sheet 90. As noted above, the sheet 90 comprises a PP cap layer 26 and a substrate layer 16 surrounding a barrier core 94.

Preferably the sheet comprises neat PP at the edges to account for chain pins that will penetrate the sheet and advance it forward through the thermoforming oven and in the mold. Penetration of the pins could cause delamination at the edges if the sheet had copolymer PVOH and adhesive extending all the way to the edges.

Other Embodiments (>3 Layers of Coating)

The number of layers of coated and uncoated PP that this technology can accommodate is unknown, but three layers of coated sheet can make a high barrier tray with acceptable form detail. The limit could be envisioned as the point where the layers are not fully bonded. Exceeding that point could result in delamination and inter-layer slippage during forming, resulting in an unacceptable part appearance and reduced barrier properties. A thicker sheet (of 1,200 micron PP) can adhere to a PVOH copolymer and adhesive coated 1,000 micron PP sheet to make a barrier composition. The boundaries in this regard are not known at this point.

Recycling

Plastic recycling involves recovering scrap or waste plastics from used articles and reprocessing the waste plastic into new products. Before recycling, plastics are sorted according to their resin identification code, a method of categorization of polymer types which was developed by the Society of Plastics Industry in 1988. This system categorizes many recyclable plastics into recycling grades numbered "1" through "7".

The Articles are Recyclable

Conventional oxygen barrier food trays comprise less than 95% PP. EVOH may be 10% of the tray and adhesive 6%, leaving only 84% PP substrate, resulting in a "7" recycling grade product, which is not very recyclable. By replacing the EVOH and adhesive with a much less onerous oxygen and water barrier system (PEI and metal oxide), it is expected that the articles disclosed herein will have a "5" recycling grade.

The Recycling Process

Trays comprised of the materials of this disclosure may be environmentally friendly during post-consumer lifecycle. It is important that recyclability claims of barrier plastic container compositions account for the chemical footprint created during the recycling phase of the product.

Recycling starts with the collection of everything placed into recycle bins that are sent to collection centers. A container such as that described in this disclosure will likely have a number engraved on it indicating the substrate material. If the substrate material is PET the container likely will display a "1". If the substrate material is PP the container likely will display a "5" for example. Typically, those articles with an EVOH coextruded layer will display a "7", which tells the consumer to throw it in the garbage rather than the recycle because it cannot be recovered and reused.

It is anticipated that containers using the technology of this disclosure will bear the number of the substrate ("1", "5", etc.) and will not display a "7". Accordingly, the trays 50 can go to collection centers rather than landfills. There, the collected trays 50 and other debris will be sorted by a variety of methods that may include human sorters and automated near infra-red and optical sorters.

Initial Sorting

These sorting methods allow paper, plastic and all other incoming items that consumers place into recycle bins to be sent to proper bins, baled and sold to a recycler. The composition of the containers of this disclosure are not expected to interfere with this sorting process as long as certain colorants are avoided. The baled plastic is sold to a post-consumer container cleaning operation ('recycler') which sorts the plastic by methods described previously.

Grinding and Further Sorting for Plastic Isolation

The plastic can be then ground into particles and sorted into streams based on what floats on water and what sinks in water. Containers or parts of containers will float if their specific gravity in under 1 g/cc (like polypropylene) and will sink if the specific gravities are over 1 g/cc (like PET). It is critical that the containers maintain the characteristic of the main substrate in this regard. High density additives such high loadings of EVOH, mineral fillers and colorant, if used at high enough levels, can cause a PP-based container or its pieces to sink or hover in water where it neither sinks nor floats. This interferes with proper sorting and may cause the container and pieces to be rejected. Also, they may mix with other materials, like PET for instance, which sink in water. This makes it more difficult for the recycler to isolate PP from PET, for example, which can lead to cross-contamination which can reduce the value of the collected materials. The barrier compositions of this disclosure preserve the specific gravity of substrates, insuring more efficient isolation.

Cap Layer Prevents Food Contamination

During recycling, some PVOH, ceramic coatings and adhesive can remain with the pieces of plastic substrate. Subsequent cleaning steps, already required today, involve additional water washing and possibly extrusion to fully comply with FDA requirements. While much of the coatings and other residual components can be removed, some may still carry over to the recycled product. These coatings and other residual components typically are considered too low in concentration in the recycled product to be of concern. Still, they are present. It is good manufacturing practice, and in fact the rule rather than the exception, that the food trays comprise a functional cap layer 26, optionally coextruded or laminated, between the food and the recycled PP material.

The cap layer 26 can prevent any residual components from getting into the food. The amount of coating and residual component contamination should be so minor that mechanical and barrier performance of the container, as well as the processing characteristics, are unchanged relative to the inherent properties of the primary substrate.

It should be noted that color and haze, which can be affected by trace amounts of PVOH and adhesive contamination, may change.

The ceramic coated PP layers may remain with the plastic collected for resell. The AlOx or SiOx coating on the PP film within the tray sidewall 62 may be just a few microns thick. The concentration of metal oxide is so low that neither will degrade nor reduce the functionality of the substrate.

The water used for plastic isolation will dissolve some or all of the coatings identified in this disclosure, especially if ground into pieces, as is typically done. This is to be expected, since the components were applied as aqueous coatings initially. The container's layers may separate during grinding and expose the previously buried PVOH copolymer and adhesive. The adhesives may or may not readily biodegrade in water, so must not harm the environment once released. Adhesives should be selected for performance and protection of the aquatic environment. For example, polyethylene imine (PEI) is a very good, water soluble, adhesive but is not biodegradable. Depending on polymeric configuration, it may be harmful to aquatic life, so a biologically inactive form should be used. Other adhesives based on urethanes or epoxides must be biologically inactive as well. Since films that can use these adhesives are not recycled, they do not need to meet the same standard as a thermoformed object which is collected and recycled. Exceval™ PVOH copolymer and PVOH homopolymer are biodegradable and can be decomposed in a conventional water treatment facility.

In summary, the recovery of substrate from the recycle stream should minimally affect the aquatic environment and the recovered substrate will maintain mechanical, barrier and processing properties inherent to virgin materials. It can be sold to thermoforming and film converters to make food packaging, which is a highly valued market. Thus, the value of the substrate is preserved for food container use.

INDUSTRIAL APPLICABILITY

The technology described herein can be used to make high oxygen barrier mono-material sheets and trays suitable for use in food applications.

It is understood that the embodiments of the disclosure described above are only particular examples which serve to illustrate the principles of the disclosure. Modifications and alternative embodiments of the disclosure are contemplated which do not depart from the scope of the disclosure as defined by the foregoing teachings and appended claims. It is intended that the claims cover all such modifications and alternative embodiments that fall within their scope.

The invention claimed is:

1. A retortable tray for holding food, the tray defining an interior and having an outer side and an inner (food contacting) side, the tray having a wall comprising:
    a ceramic film layer, the ceramic film layer comprising a metal oxide coated polyolefin film;
    one or more copolymer layers, at least one copolymer layer comprising a polyvinyl alcohol (PVOH); and
    a substrate, the substrate comprising a polyolefin selected from the group consisting of polypropylene (PP), polyethylene terephthalate (PET), polyethylene (PE) and polystyrene (PS); wherein
    the substrate comprises at least about 98 wt % of the tray; and
    the at least one copolymer layer also comprises a water soluble adhesive component which sticks to the substrate.

2. The retortable tray of claim 1, wherein:
    the at least one copolymer layer also comprises a cross-linking additive.

* * * * *